United States Patent
Skelton et al.

(10) Patent No.: US 7,472,627 B2
(45) Date of Patent: Jan. 6, 2009

(54) AUTOMATIC TRANSMISSION MID ADJUST LINKAGE

(75) Inventors: Michael E. Skelton, Belleville, MI (US); Michael C. Danielian, Metamora, MI (US)

(73) Assignee: Generals Motors Corporation, Detroit, MI (US)

( * ) Notice: Subject to any disclaimer, the term of this patent is extended or adjusted under 35 U.S.C. 154(b) by 784 days.

(21) Appl. No.: 10/968,852

(22) Filed: Oct. 19, 2004

(65) Prior Publication Data

US 2006/0081083 A1    Apr. 20, 2006

(51) Int. Cl.
*F16H 59/10* (2006.01)
*G05G 1/00* (2006.01)

(52) U.S. Cl. ............ 74/586; 74/473.1; 74/473.36; 403/379.3

(58) Field of Classification Search ............ 74/469, 74/473.1, 473.36, 501.5 R, 502.4, 503, 586; 403/375, 379.3
See application file for complete search history.

(56) References Cited

U.S. PATENT DOCUMENTS

| | | | | |
|---|---|---|---|---|
| 4,869,123 A | * | 9/1989 | Stocker | 74/501.5 R |
| 5,027,673 A | * | 7/1991 | Behrens et al. | 74/473.1 |
| 5,222,413 A | * | 6/1993 | Gallas et al. | 74/502.4 |
| 5,673,596 A | * | 10/1997 | Lu | 74/502.6 |
| 6,082,218 A | | 7/2000 | Osborn et al. | 74/502.4 |
| 6,435,056 B2 | | 8/2002 | Meyer | 74/502.4 |
| 6,520,043 B1 | * | 2/2003 | Wang | 74/473.15 |
| 6,692,320 B1 | | 2/2004 | Sawyer | 440/86 |

* cited by examiner

*Primary Examiner*—William C Joyce

(57) ABSTRACT

An adjustable linkage comprises a housing, a slider slidable within the housing, and a locking member seated within an opening in the housing and selectively contacting the slider to prevent sliding movement thereof. The adjustable linkage is attached between a first attachment point and a second attachment point to automatically adjust a linkage length. Preferably, the adjustable linkage is used within a vehicle as a link between an automatic vehicle transmission and a vehicle shifter, with the design allowing ease of installation within the vehicle.

8 Claims, 2 Drawing Sheets

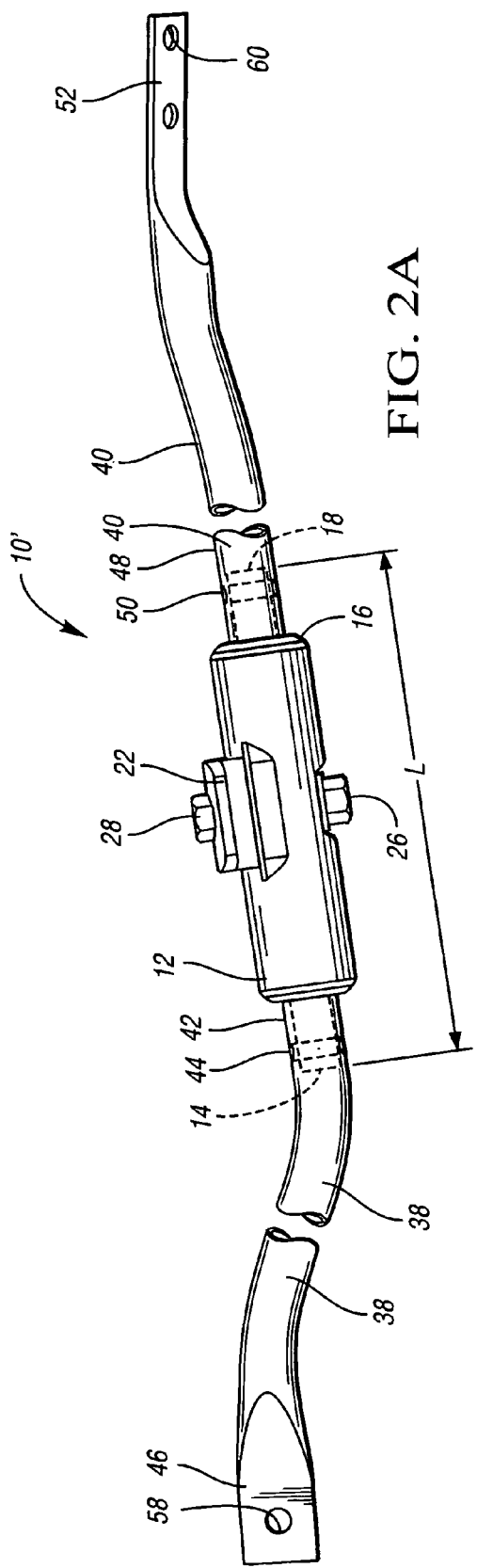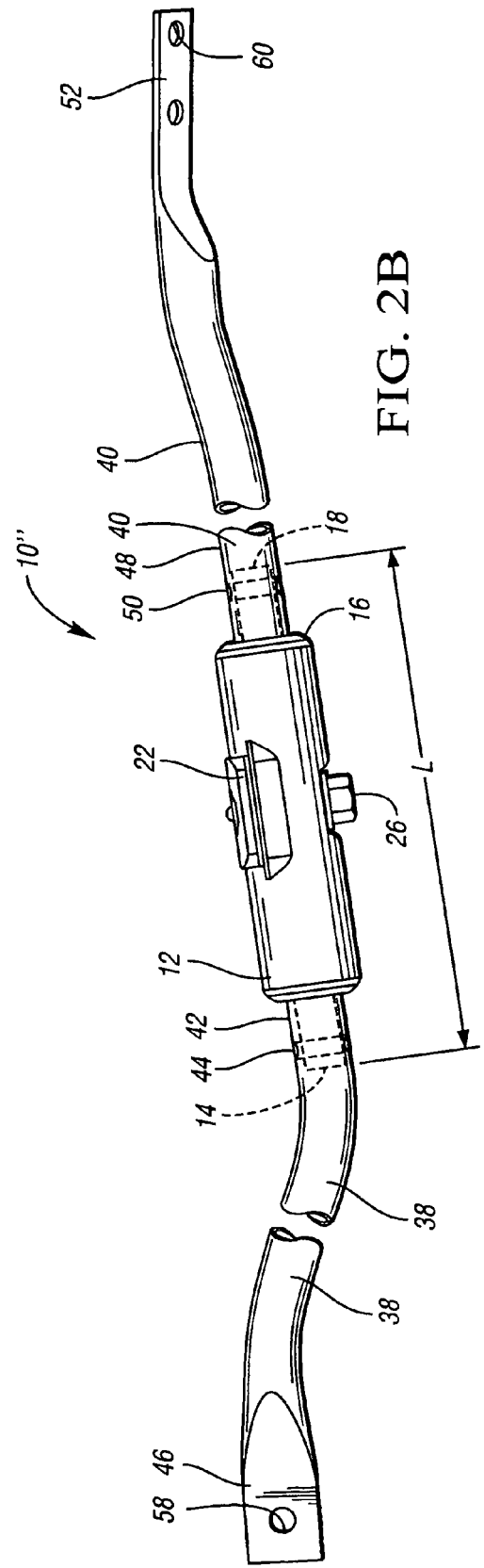

AUTOMATIC TRANSMISSION MID ADJUST LINKAGE

TECHNICAL FIELD

The present invention relates to a linkage between an automatic vehicle transmission and a vehicle shifter, and, more particularly, to a linkage that automatically adjusts to an appropriate length upon attachment between a vehicle transmission and a vehicle shifter.

BACKGROUND OF THE INVENTION

Conventional motor vehicles include an engine, with a transmission coupled to the engine. In a vehicle with an automatic transmission, a linkage connects the transmission to a shifter spaced from the transmission. Typically, the shifter mounts to a vehicle floor pan within an occupant compartment, such that the linkage allows an occupant to control the transmission through movement of the shifter. The distance between the transmission and the shifter varies from vehicle to vehicle.

SUMMARY OF THE INVENTION

The present invention provides a solid linkage which automatically adjusts in length to accommodate correction over a variety of distances. The adjustable linkage includes a housing with a first end attachable with respect to a first attachment point, and a slider with a second end attachable with respect to a second attachment point. The slider slides within the housing to automatically adjust a distance between the first and second ends (defined as a "linkage length") by moving the second end with respect to the first end upon attachment of the housing and slider with respect to the first and second attachment points. The first end may be attached directly at the first attachment point, and the second end may be attached directly at the second attachment point.

Alternatively, the adjustable linkage may include a first link that extends between the first end and the first attachment point, and/or a second link that extends between the second end and the second attachment point. For example, in the preferred embodiment, a transmission link attaches to the first end, and also to an automatic vehicle transmission at the first attachment point. Similarly, a shifter link attaches to the second end, and also to a vehicle shifter at the second attachment point.

The housing includes an opening, with a locking member seated at least partially within the opening. The locking member is selectively movable between a locked position and an unlocked position. In the locked position, the locking member seats far enough within the housing to contact the slider to restrain movement of the slider, thereby fixing the linkage length. In the unlocked position, the locking member does not interfere with the slider. The locking member preferably includes a ramp, with the ramp interfering with the housing to prevent movement of the locking member from the unlocked position to the locked position without application of a force. When the locking member is in the locked position, the ramp snugly contacts a portion of the housing to maintain the locked position. Preferably, the locking member includes a first toothed surface, while the slider includes a second toothed surface. When the locking member is in the locked position, the first and second toothed surfaces interfit to further restrain movement of the slider within the housing.

A bolt extends through the housing, a slot in the slider, and the locking member. Tightening the bolt moves the locking member from the unlocked position to the locked position, and maintains the locked position while tightened. Preferably, the transmission link and the shifter link have substantially similar lengths, such that linkage adjustment occurs approximately midway between the shifter and the transmission and the bolt is easily accessible to facilitate ease of assembly. The slider includes a slot through which the bolt extends, such that the slider may move with respect to the housing without interference from the bolt. A spring disposed within the housing biases the slider toward the second attachment point, thereby biasing the linkage toward a maximum linkage length.

The present invention also provides a method of installing an adjustable linkage characterized by a selectively variable length within a vehicle including the steps of attaching the adjustable linkage to the first attachment point on the vehicle transmission, and attaching the adjustable linkage to the second attachment point on the vehicle shifter, with the second attachment point spaced from the first attachment point by a first distance. Attaching the adjustable linkage between the first and second attachment points substantially limits rotational movement of the adjustable linkage with respect to the transmission, while automatically setting the variable length at the first distance. A locking mechanism, namely, the locking member described herein, can then be tightened to fix the variable length at the first distance. Since the adjustable linkage automatically adjusts the linkage length upon fixation to the first and second attachment points, an inventory of substantially identical adjustable linkages can be maintained for use within a wide variety of vehicle configurations.

The above features and advantages and other features and advantages of the present invention are readily apparent from the following detailed description of the best modes for carrying out the invention when taken in connection with the accompanying drawings.

BRIEF DESCRIPTION OF THE DRAWINGS

FIG. 2A shows a perspective view of the adjustable linkage of FIG. 1 with a locking member in an unlocked position; and FIG. 2B shows a perspective view of the adjustable linkage of FIG. 1 with the locking member in a locked position.

DESCRIPTION OF THE PREFERRED EMBODIMENTS

Figure 1:
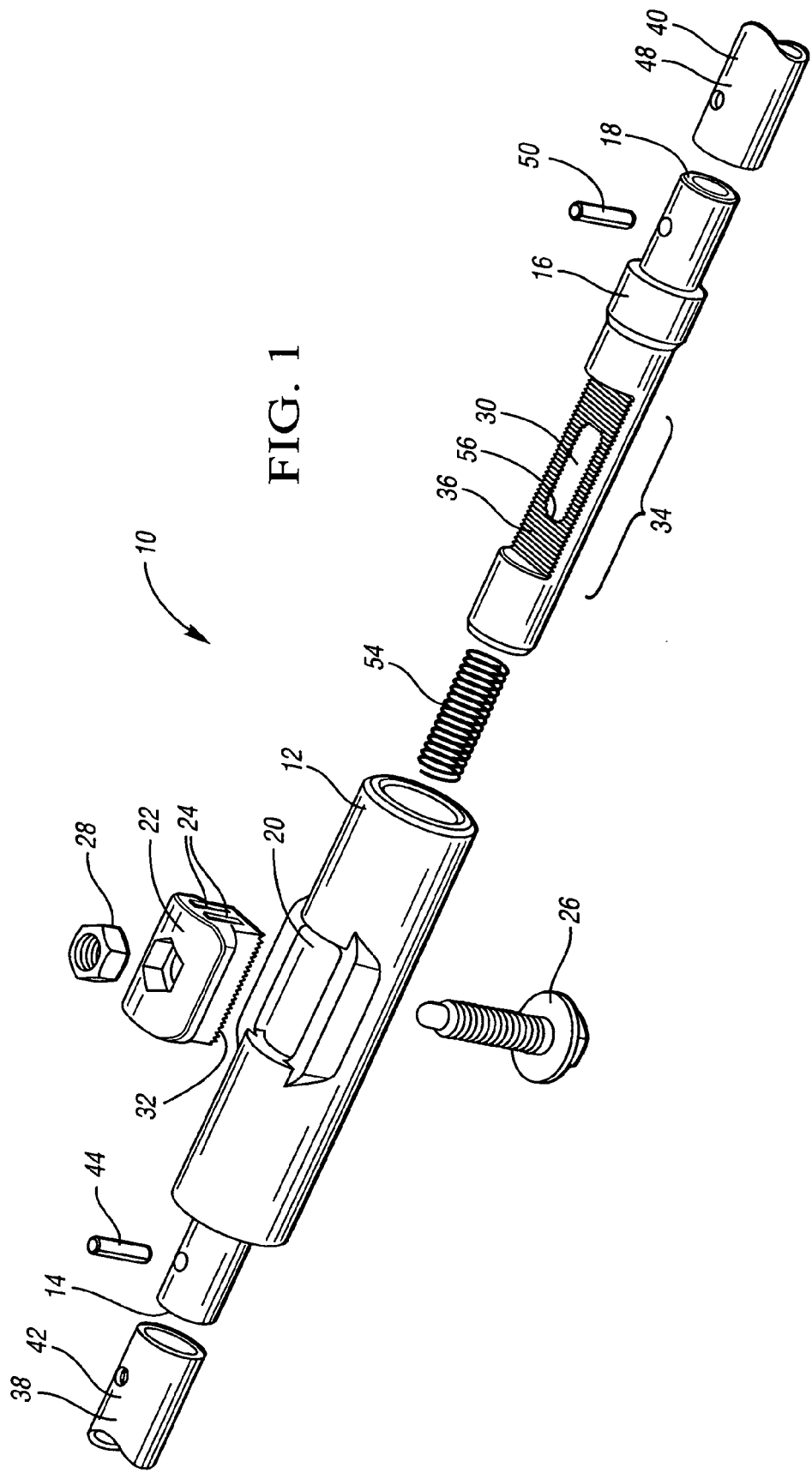
FIG. 1 shows an exploded perspective view of an adjustable linkage according to the present invention.

Referring to FIG. 1, an adjustable linkage according to the present invention is generally shown at 10. The adjustable linkage 10 includes a housing 12 having a first end 14, and a slider 16 having a second end 18. A linkage length L is defined as the distance between the first end 14 and the second end 18. The slider 16 is slidable within the housing 12 to adjust the linkage length L as necessary for the desired application. As shown in the Figures, the housing 12 and the slider 16 are preferably cylindrical, though as long as the slider 16 fits within the housing 12, any shape may be utilized.

The housing 12 includes an opening 20 for receiving a locking member 22. The locking member 22 is selectively movable between an unlocked position 10', shown in FIG. 2A, and a locked position 10", shown in FIG. 2B. In the locked position 10", the locking member 22 seats far enough within the housing 12 to contact the slider 16, thereby restraining movement of the slider 16 to fix the linkage length L. In the unlocked position 10', the locking member 22 does not seat far enough inside of the housing 12 to contact the slider 16, and thus the slider 16 is free to move with respect the housing 12.

The locking member 22 preferably includes a plurality of ramps 24. Ramps 24 are shown on one side of the locking member 22 in FIG. 1; preferably, similar ramps are located on the opposed side of the locking member (not shown). When the locking member 22 is in the unlocked position 10', the ramps 24 prevent movement of the locking member 22 into the locked position 10" without application of a force. For example, the locking member 22 could be pressed into the housing 12 until contacting the slider 16. Alternatively, as with the present invention, a bolt 26 extending through the housing 12, the slider 16, the locking member 22, and a nut 28 may be tightened, thereby providing the force necessary to move the locking member 22 into the locked position 10". A slot 30 (shown in FIG. 1) in the slider 16 receives the bolt 26. Thus as the slider 16 moves with respect to the housing 12, the slot 30 travels along the bolt 26, thereby allowing the slider 16 to move without interference from the bolt 26. In the preferred embodiment, the slot 30 is approximately 12 millimeters (mm) long, thereby allowing a total of 12 mm of adjustment in the linkage length L. Varying the length of the slot 30 in the slider 16 can increase or decrease the total amount of adjustment provided.

Preferably, the locking member 22 includes a first toothed surface 32, as shown in FIG. 1. The slider 16, while generally cylindrical in shape, includes an adjustment portion 34 for receiving the locking member 22 when the locking member 22 is in the locked position 10". Preferably, the adjustment portion 34 comprises a second toothed surface 36, with the first and second toothed surfaces 32, 36 interfitting to prevent sliding movement of the slider 16 within the housing 12 when the locking member 22 is in the locked position 10". However, the present invention may be practiced without the first and second toothed surfaces 32, 26 by relying on the force exerted by the locking member 22 on the slider 16 to prevent sliding movement.

In the preferred embodiment, the adjustable linkage 10 further comprises a transmission link 38 and a shifter link 40. A first transmission link end 42 of the transmission link 38 surrounds the first end 14 of the housing 12, with a pin 44 extending therethrough for attachment. Referring to FIG. 2B, a second transmission link end 46 adapts to attach to an automatic vehicle transmission (not shown), thereby attaching the adjustable link 10 to the transmission. Similarly, a first shifter link end 48 surrounds the second end 18 of the slider 16, with a pin 50 extending therethrough for attachment. A second shifter link end 52 adapts to attach to a vehicle shifter (not shown), thereby attaching the adjustable link 10 to the shifter. It should be noted, however, that the slider 16 may be formed with the transmission link 38 as a unitary component, and the housing 12 may be formed with the shifter link 40 as a unitary component, without changing the inventive concept.

The adjustable linkage is preferably shipped with the locking member 22 in the unlocked position 10'. A spring 54 disposed within the housing 12 biases the slider 16 away from the first end 14 of the housing 12 to a maximum linkage length. However, since the bolt 26 extends through the slot 30 in the slider 16, the slider 16 may not extend outside of the housing 12 beyond a point where a slot end 56 contacts the bolt 26. In the unlocked position 10', the nut 28 retains the bolt 26 within the adjustable linkage 10. However, the bolt 26 is not tightened. The second transmission link end 46 is attached to the transmission at a first attachment point 58. At this point, the slider 16 is still free to move within the housing 12 since the adjustable linkage 10 is not fixed between two points. The second shifter link end 52 is then attached to the shifter at a second attachment point 60. Attachment of the adjustable linkage 10 to the second attachment point 60 will likely require sliding movement of the slider 16 into the housing 12, and compression of the spring 54 within the housing 12 to reduce the linkage length L from the maximum linkage length (as shipped). Since the bolt 26 is not yet tightened, the slider 16 is free to move within the housing 12. Therefore, attaching the adjustable linkage 10 to both the first and second attachment points 58, 60, necessarily and automatically adjusts the linkage length L.

To fix the linkage length L, a locking mechanism is engaged. In the preferred embodiment, the bolt 26 is tightened, thereby moving the locking member 22 into the locked position 10". The ramps 24 on the locking member 22 help maintain the locked position 10", while the first and second toothed surfaces 32, 36 engage to further prevent movement of the slider 16. No secondary corrective adjustments are needed, since the present invention eliminates an additional degree of freedom; that is, the adjustable linkage 10 is constrained between the first and second attachment points 58, 60. Preferably, the transmission link 38 and the shifter link 40 are approximately the same length, such that the locking mechanism can be engaged, i.e. the bolt 26 can be tightened, approximately midway between the transmission and the shifter to facilitate ease of assembly. Ideally, the bolt 26 is tightened using the same equipment used to attach the second shifter link end 52 to the second attachment point 60, thereby allowing both steps to be performed in the least amount of time. Since the adjustable linkage 10 automatically adjusts the linkage length L upon fixation to the first and second attachment points 58, 60, an inventory of substantially identical adjustable linkages 10 can be maintained for use within a wide variety of vehicle configurations.

It is important to note that the present invention may be practiced without the transmission link 38 and the shifter link 40 without changing the inventive concept. It is conceivable that the first end 14 may attach directly to the transmission at the first attachment point 58, while the second end 18 may attach directly to the shifter at the second attachment point 60. Furthermore, use of the present invention need not be restricted to adjustable attachment between an automatic vehicle transmission and a vehicle shifter. The adjustable linkage 10 may be utilized for a wide variety of applications. Additionally, any sort of link may couple the first end 14 to the first attachment point 58 and the second end 18 to the second attachment point 60. For the present invention, it is necessary only to fix the adjustable linkage 10 between two points, deemed herein the first and second attachment points 58, 60. Fixing the adjustable linkage 10 between the first and second attachment points 58, 60 substantially limits rotational movement of the adjustable linkage 10 with respect to the transmission, while automatically determining the proper linkage length L.

While the best mode for carrying out the invention has been described in detail, it is to be understood that the terminology used is intended to be in the nature of words and description rather than of limitation. Those familiar with the art to which this invention relates will recognize that many modifications of the present invention are possible in light of the above teachings. It is, therefore, to be understood that within the scope of the appended claims, the invention may be practiced in a substantially equivalent way other than as specifically described herein.

The invention claimed is:

1. An adjustable linkage comprising:
   a housing including a first end attached with respect to a first attachment point, wherein said housing forms an opening;
   a slider including a second end attached with respect to a second attachment point; and
   said slider being automatically movable within said housing to adjust a distance between said first end and said second end by moving said second end with respect to said first end upon attachment of said housing and slider with respect to said attachment points;
   a locking member seated at least partially within said opening, said locking member being selectively movable between a locked position, wherein said locking member contacts said slider to restrain sliding movement of said slider, thereby fixing said distance between said first end and said second end, and an unlocked position, wherein said locking member does not interfere with movement of said slider;
   wherein said locking member includes at least one ramp, said at least one ramp preventing movement of said locking member from said unlocked position to said locked position without application of a force, and snugly contacting at least a portion of said housing when said locking member is in said locked position, thereby maintaining said locked position to fix said distance between said first end and said second end.

2. The adjustable linkage of claim 1, wherein said locking member includes a first toothed surface, said locking member contacting said slider at said first toothed surface for restraining movement of said slider when said locking member is in said locked position.

3. The adjustable linkage of claim 2, wherein said slider includes a second toothed surface which cooperates with said first toothed surface to restrain movement of said slider when said locking member is in said locked position.

4. The adjustable linkage of claim 1, farther comprising:
   a bolt extending through said housing, said slider and said locking member, said bolt being tightenable to move said locking member from said unlocked position to said locked position, and to maintain said locking member in said locked position.

5. The adjustable linkage of claim 4 wherein said slider forms a slot through which said bolt extends, said slot being sufficiently sized to allow said slider to move with respect to said housing without interference from said bolt.

6. The adjustable linkage of claim 1 further comprising:
   a spring disposed within said housing, said spring biasing said slider toward said second attachment point.

7. The adjustable linkage of claim 1 further comprising:
   a transmission link extending between said first end and an automatic vehicle transmission, said transmission link attaching to the transmission at said first attachment point to attach said first end with respect to said first attachment point, and a shifter link extending between said second end and a vehicle shifter, said shifter link attaching to the shifter at said second attachment point to attach said second end with respect to said second attachment point.

8. The adjustable linkage of claim 7 wherein said transmission link and said shifter link are characterized by a substantially identical length.

* * * * *